United States Patent [19]

Greenhalgh et al.

[11] Patent Number: 4,764,549

[45] Date of Patent: Aug. 16, 1988

[54] LOW TEMPERATURE CURING OF ELASTOMER

[75] Inventors: Milton S. Greenhalgh, Fairfield; Joseph E. Vostovich, Bridgeport, both of Conn.

[73] Assignee: Vulkor, Incorporated, Lowell, Mass.

[21] Appl. No.: 906,578

[22] Filed: Sep. 9, 1986

Related U.S. Application Data

[63] Continuation of Ser. No. 648,405, Sep. 7, 1984, abandoned.

[51] Int. Cl.[4] .................... C08K 3/34; C08K 3/04; B05D 5/12
[52] U.S. Cl. .................... 427/118; 427/120; 427/388.2; 427/409; 524/352; 524/445; 524/447; 524/488; 524/519; 524/552; 525/331.1
[58] Field of Search ............ 525/331.1; 524/445, 524/447, 474, 488, 552; 427/388.2, 120, 118, 409

[56] References Cited

U.S. PATENT DOCUMENTS

| | | | |
|---|---|---|---|
| 2,544,746 | 3/1951 | Baum | 525/331.1 |
| 2,958,680 | 11/1960 | Brooks et al. | 525/331.1 |
| 3,873,489 | 3/1975 | Thurn et al. | 524/571 |
| 3,940,364 | 2/1975 | Layer | 524/111 |
| 3,968,062 | 7/1976 | Ecsedy | 525/189 |
| 4,030,799 | 7/1977 | Westermann | 525/331.1 |
| 4,046,849 | 9/1977 | Lever et al. | 427/120 |
| 4,101,478 | 7/1978 | Mitrofanovich et al. | 524/484 |
| 4,138,537 | 2/1979 | Dembowski et al. | 524/552 |
| 4,222,915 | 9/1980 | Wolff et al. | 524/430 |
| 4,248,987 | 2/1981 | Maeda et al. | 525/331.1 |
| 4,259,468 | 3/1981 | Kajiura et al. | 525/331.7 |
| 4,300,973 | 11/1981 | Bezwada | 427/388.2 |
| 4,317,265 | 3/1982 | Chase et al. | 525/332.3 |
| 4,395,349 | 7/1983 | Kinoshita | 525/331.1 |
| 4,433,105 | 2/1984 | Matsuda et al. | 525/332.1 |
| 4,461,875 | 7/1984 | Crepeau | 525/331.8 |
| 4,469,830 | 9/1984 | Bruck et al. | 524/109 |
| 4,472,549 | 9/1984 | Roos et al. | 524/108 |
| 4,632,954 | 12/1986 | Dalhuisen | 524/240 |

*Primary Examiner*—Herbert J. Lilling
*Attorney, Agent, or Firm*—Hedman, Gibson, Costigan & Hoare

[57] ABSTRACT

A novel curable rubber composition is described which is curable at low temperatures.

4 Claims, No Drawings

LOW TEMPERATURE CURING OF ELASTOMER

This is a continuation of Ser. No. 06/648,405, filed Sept. 7, 1984, which is a now abandoned.

BACKGROUND OF THE INVENTION

Vulcanized and crosslinked elastomers and polymers are well known for use as insulation compositions. These compositions are usually cured by the application of heat although other means for curing may be utilized. Steam has been utilized as a heating medium although higher temperatures involve progressively disproportionally greater increases in pressure.

The problems inherent in using steam led to the use of ultra high velocity gases under moderate pressure to vulcanize and/or crosslink elastomers or polymers. The use of a steam of gas at high temperature effectively penetrates through and/or drives away the thermally insulating static boundary layer or stagnant film of air or other gas molecules residing on or about the curable composition. This results in a sweeping of any air or gas that can act as an insulation barrier to the application of heat and thus obstruct efficient heat transfer. The use of high velocity gases for curing elastomers is described in U.S. Pat. No. 4,069,286 which is incorporated by reference.

It has been found that the hot gas curing system has certain limitations when it is necessary to cure at extremely low temperatures, i.e. in the area of 250° F. Low temperature cures are required when external rubber jackets are applied to composite cables that include internal thermoplastic materials that deform and exhibit flow properties under conditions used to cure rubber compounds. To solve this problem, it has been proposed to use lead curing systems and salt bath pressurized cures to achieve low temperature cures.

The applicants have discovered that the addition of a mixture of a dialkylthiourea and an aryl guanadine at the point of extrusion may be used to reduce the curing temperature to about 250° F. and still obtain a proper cure without causing premature set up of the rubber compound.

In the prior art, dialkylthioureas and aryl guanadines have been used separately to accelerate the cure of rubber compositions. These materials have been used as ultra-accelerators for curing systems that have been used for curing latex rubber compositions. These compositions may be cured in short cycles because of the absence of the mill scorch problem that is experienced in dry rubber compounding. Generally ultra accelerators have not been used in connection with the curing of dry compounded materials because of the scorch problem that results when dry compounded formulations containing fast curing or "hot" curing systems are handled using conventional equipment and procedures which require relatively high curing temperatures.

Therefore it is a primary object of the invention to provide a method for the rapid, low temperature curing of a dry compounded rubber composition.

It is also an object of this invention to provide a method of rapidly curing a dry compounded rubber composition using a fast moving gaseous stream.

DETAILED DESCRIPTION OF THE INVENTION

The composition of the invention comprises:
(a) a curable rubber base stock;
(b) reinforcing filler and/or solid extender;
(c) an oil extender;
(d) a curing system which comprises a vulcanizing agent and an accelerating system which is a mixture of a dialkylthiourea and an aryl guanadine.

The aryl guanadines include diphenylguanadine, mixed diarylguanadines (Accelerator 49), diphenylguanadine phthalate, di-o-tolylguanadine salt of dicatechol borate and the like. The dialkylthioureas include N,N'-diethylthiourea, N,N'-dibutylthiourea; and the like.

The preferred accelerator system is a mixture of N,N'-diethylthiourea and a di-ortho-tolylguanadine salt which may comprise from 90:10 to 10:90 parts by weight of each component per 100 parts by weight of accelerator composition and preferably from 60:40 to 40:60 parts by weight per 100 parts by weight of the accelerator composition. The total amount utilized will comprise from 0.5 to 5% by total weight of the elastomer composition.

The preferred form of the N,N'-diethylthiourea is pelletized having 100% solids which avoids the dust problems that are inherent in a powder form. The preferred di-ortho-tolylguanadine salt is formed with dicatechol borate.

The composition also preferably includes pigment, stabilizers and processing aids. The rubber stock may comprise, as a primary elastomer, synthetic rubbers such as neoprene, nitrile rubber, EPDM rubber, chlorosulfonated polyethylene rubber and the like or mixtures of such rubbers. The preferred rubber stock is a neoprene rubber. Suitable neoprenes are described in Rubber Chem. & Tech. V. 49, No. 3, July-August 1976, which is incorporated by reference.

Compositions according to the invention may comprise the following components:

|  | Parts by Weight |
| --- | --- |
| rubber stock | 100 |
| reinforcing filler and/or solid extender | 10–125 |
| oil extender | 5–20 |
| processing aids | 0–5 |
| stabilizers | 0–5 |

The composition is described above as parts by weight of each component per 100 parts by weight of the rubber stock component.

The reinforcing filler may comprise various carbon blacks for reinforcing the final product. Solid extenders include finely divided clays, whitings, silicas, aluminas, talc and other materials that can extend and/or enhance the properties of the cured product or act as processing aids during compounding or extrusion. Pigments for imparting other colors to rubber compounds may be added. The stabilizer may be present in a stabilizing amount which is effective to stabilize the composition.

The elastomer may be cured using as vulcanizing agent a magnesium oxide-zinc oxide system or a lead oxide system. For moisture resistant products, the preferred curing system is based on lead oxide. Various lead oxides may be utilized such as red lead, litharge or lead dioxide. Where lead oxides are used in the curing system, residual amounts of the lead oxide will exert a stabilizing effect.

The amount of the magnesium oxide-zinc oxide mixture used as a vulcanizing agent may be from 4 to 25 parts by weight of a mixture having a 5:1 to 1.5:1 ratio of zinc oxide to magnesium oxide.

The temperature of the heated gas for accelerating the vulcanizing curing systems should be high enough to cure the elastomer jacket without causing any substantial distortion or melt flow of any inner insulating layer of a thermoplastic material. Generally temperatures of from 200° F. to 300° F. and preferably from 230° F. to 280° F. may be utilized for optimum effectiveness with the curing system of the invention. The temperatures may be adjusted to complement the line speed of a continuous curing operation to provide a sufficient degree of curing during the time of exposure to the hot gaseous environment. The pressure of the curing step may vary from 3 to 10 atmospheres, preferably 5 to 8 atmospheres.

The dwell period is also affected by the pressure that is used in the curing system as well as the velocity of the hot gas flow. Generally the velocity of the gas flow will vary from 500 to 6000 ft./min. and preferably from 2000 to 3000 ft./min. The gas should be inert with respect to the rubber compound. Suitable examples include nitrogen, carbon dioxide, argon and the like.

The curing system is particularly adapted for use in an uninterrupted tandem production facility which includes a continuous extrusion molding or forming operation combined in operating sequence with a high velocity pressurized gaseous stream. This sequential production-coating-curing system may be used to maximize the benefit of the rapid cure rates of the novel elastomeric composition of the present invention. These rapid cure rates in addition to providing a low temperature cure profile also permit hugh volume continuous production without any substantial interruption that may be caused with systems that do not rapidly cure at low temperatures.

The rubber base stock, the reinforcing fillers and oil extenders are combined in a high shear mixing apparatus such as a Banbury. Thereafter the mixed components are dropped onto a mill or an extruder for further mixing. Thereafter strips approximately 3" wide are sheeted off to form a hat that is fed to a cross-head extruder preferably by means of a roller feed that is synchronized with the extruder screw. The accelerator and vulcanizing agent are fed into the cross-head extruder so that it is present in the compounded curable base stock for only a few seconds before the extrudate is placed on wire in the cross-head and passed to the curing chamber. The temperature in the cross-head extruder is maintained at a temperature that is sufficient to masticate the rubber compound below the curing temperature. Wire is fed through the cross-head at a speed of 5-500 feet per minute depending on the pressure, temperature and residence time in the hot gas curing chamber.

The apparatus for the practice of the invention may comprise various arrangements and configuration of known elements. The most advantageous, convenient and efficient mode comprises an elongated curing chamber or housing having a section of pipe of an appropriate diameter to accommodate the article or body undergoing curing. The pipe should also be capable of withstanding any pressure that is applied to the system and long enough to provide a sufficient residence time to allow the composition to cure properly. Residence times of 0.1 to 5 minutes may be utilized depending upon the temperature and pressure that is used to cure a particular cable construction. In the usual configuration, the apparatus will be provided with associated cooling means to reduce the temperature of the cured article. Thus, an embodiment of the curing apparatus may include a long section of pipe or a similar enclosure, comprising a heat curing section which is provided with a hot gas stream wherein a stream of hot gas is passed and which extends therefrom directly, or through an intermediate section, into a water leg or section containing a cooling liquid. The heating area or section of the pipe or continuous chamber is appropriately connected with a source of hot pressurized gas which is passed through the chamber and which extends therefrom directly or through an intermediate section into a cooling zone that contains a water leg or an area containing a liquid and/or a cooling gas.

The extrusion and curing parameters for compositions within the present invention may be determined using a Brabender torque rheometer. A compound containing the curing system is placed in the torque rheometer at a predetermined temperature and shear rate. The minimum and maximum time to cure is determined as well as the minimum and maximum torque for each cure. The data obtained is compared to data obtained from a control compound and the processing temperature and time are determined accordingly.

DESCRIPTION OF THE PREFERRED EMBODIMENTS

The following examples are included to illustrate the invention and are not to be construed as limiting the invention.

EXAMPLE 1

The following composition was prepared by mixing the ingredients at a Banbury mill:

| | |
|---|---|
| polychloroprene (Neoprene Type TW) | 660 g |
| black pigment 50% FEF Black (N-550) 50% Sterling NS-1 Black (N-762) | 268 g |
| koalin clay (Catalpo) | 327 g |
| oil extender (Sundex 790) | 100 g |
| microcrystalline wax (Sunoco anti-check) | 19.2 g |
| process aid (Millrex) | 15.4 g |
| phenyl-α-naphthylamine | 13.8 g |
| red lead (AC-34) | 107 g |
| petrolatum (Witco protopet 2A) | 14.9 g |

The compounded product was fed in 3"×¼"×30' strips to an extruder where it was blended with a total of 3.54%, by weight of compounded product, of a 50:50 mixture of pellets of N,N'-diethylthiourea and the di-ortho-tolylguanadine salt of dicatechol borate was also metered into the extruder tube. The extrudate was extruded around a moving cable at 15'/minute and passed into a 23' gas pipe at a temperature of 280° F., a gas flow velocity of 3000'/minute, a pressure of 100 psi and a residence time of 92 seconds to produce a cable having a cured polychloroprene jacket without distortion of the inner thermoplastic insulation.

CONTROL

A control composition having substantially the same formulation of Example 1 except that the accelerator was 0.61% of a 70% by weight dispersion of N,N'-diethylthiourea in 30% by weight of paraffin. The cure was carried out at 280° F. for 92 seconds.

We claim:

1. A process for low temperature curing of an external cable jacket of a compounded polychloroprene rubber on the exterior of a composite cable that includes thermoplastic materials, said process comprising adding to polychloroprene rubber an amount of a curing system which comprises a vulcanizing agent selected from the group consisting of magnesium oxide-zinc oxide and lead oxide with a 90:10 to 10:90 parts by weight mixture of N,N'-diethylthiourea and the di-ortho-tolylguanadine salt of dicatechol borate and thereafter heating said rubber composition at a temperature of from 200°–300° F. for from 0.1 to 5 minutes at a pressure of from 3–10 atmospheres to effect the cure.

2. A process as defined in claim 1 wherein the compounded curable rubber base stock contains a clay filler, an oil extender and stabilizers.

3. A process as defined in claim 2 wherein the accelerators are added to the compounded polychloroprene rubber immediately prior to curing the composition.

4. A process as defined in claim 1 wherein the heating step is carried out at a temperature of from 230°–280° F.

* * * * *